C. T. COLBERY.
CARPET FASTENER.
APPLICATION FILED OCT. 25, 1917.
1,289,119.
Patented Dec. 31, 1918.
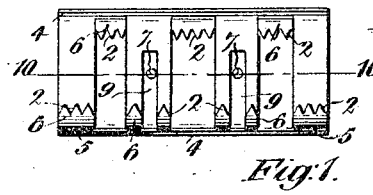
Fig. 2.
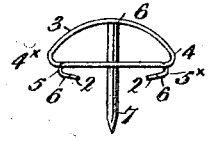
Fig. 3.
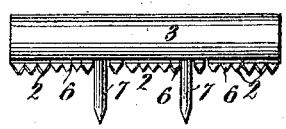
Fig. 1.
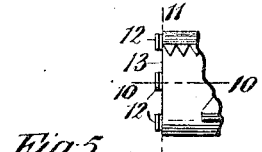
Fig. 6.
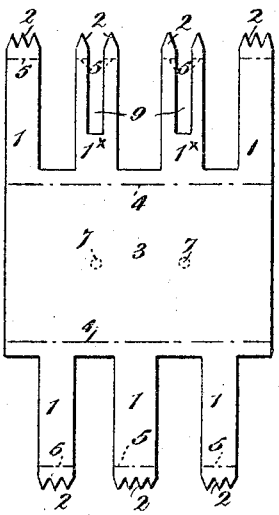
Fig. 4.
Fig. 5.
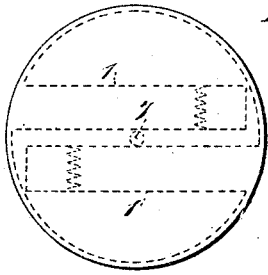
Fig. 7.
Fig. 9.
Fig. 8.
Fig. 10.
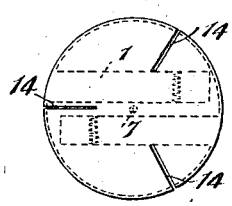
Fig. 11.
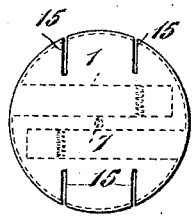
Fig. 12.
Witnesses:
Chas. E. Whiteman
H. D. Penney
Inventor:
Charles Thomas Colbery,
By his Att'y, F. H. Richards

UNITED STATES PATENT OFFICE.

CHARLES T. COLBERY, OF CHARLTON, LONDON, ENGLAND.

CARPET-FASTENER.

1,289,119.  Specification of Letters Patent.  Patented Dec. 31, 1918.

Application filed October 25, 1917. Serial No. 198,389.

*To all whom it may concern:*

Be it known that I, CHARLES THOMAS COLBERY, a subject of the King of Great Britain, residing in Charlton, London, S. E. 7, England, have invented certain new and useful Improvements in Carpet-Fasteners, of which the following is a specification.

My invention herein disclosed is broadly for a fabric securing device, by the use of which flexible fabrics, such as carpets, rugs, or the like, may be secured in place upon floors, etc., singly or collectively, or rents therein covered; which device while particularly adapted for use with rugs and carpets, may in like manner be used for the attachment of tapestries, etc., to walls and ceilings, without departing from the scope of my invention.

My invention is based upon a principle which, for the purposes of this specification, I shall term the "opposite pull" principle. This principle may be thus explained. If an arched plate be placed convexly upward upon a flat surface so as to rest by its edges thereon, and if the center or crown of the arch be depressed, the said edges will move apart and away from an imaginary plane parallel to the edges and normal to the flat surface on which the arched plate rests and passing through the center or crown of the arch. If to the said edges arms be attached and doubled up under the arch and arranged to lie parallel to the said flat surface then the arms will move with the edges of the arched plate and of course in the same directions as the edges to which they are attached. If the said arms extend beyond the plane normal to the flat surface and passing through the center or crown of the arch then as the edges move away from the said plane the free ends of the said arms will move toward the said plane. In other words, as depression of the arch takes place the edges of the arched plate move outward and the free ends of the arms move inward.

In carrying my invention into effect I take advantage of this principle and I adapt it to my purpose by applying (to the arms) claws or teeth pointing in the direction of movement, and adapted to bite into the carpet, rug or the like, and by applying to the crown of the arch, pins or nails adapted to be driven into the floor, so depressing the center of the arch, and fixing the device in its required position.

My said invention is fully shown and described in the following specification, of which the accompanying drawings form a part, wherein similar letters or numerals of reference designate like or equivalent parts wherever found throughout the several views, and in which—

Figure 1 is a view in side elevation of one form of embodiment of my invention;

Fig. 2 a view of such embodiment shown in Fig. 1 looking upward from the bottom thereof; and Fig. 3 is an end view thereof looking from the left of Fig. 1; while Fig. 4, is a plan view of the blank of resilient sheet metal which is struck up by suitable dies therefrom and afterward bent into proper shape.

Figs. 5, 6, and 7 are respectively an end view in elevation, an underneath plan view, and a side view in elevation of a slightly modified form of construction.

Fig. 8 is a plan view looking upward from the bottom of a slightly modified form in which instead of being provided with points at the end the carpet securing-members have struck out therefrom reversely pointed V shaped teeth; and Fig. 10 is an end view of the construction shown in Fig. 8.

Fig. 9 is a top plan view of a modified form of construction with a concaved cylindrical top-plate, and Figs. 11 and 12 are top plan views of the form of construction shown in Fig. 9 in which the top-plate is provided, in the case of Fig. 11 with radial, and in the case of Fig. 12 the chord slits, by which the resiliency under pressure of the top is increased.

Referring to the drawings:—

It will be seen that as shown in Figs. 1 and 2, I take a piece of sheet metal and form it into the shape shown in Fig. 4. In the particular form illustrated there are seven arms 1, $1^x$ serrated at their free ends to form teeth 2. I bend the body-piece 3 of the metal into an arched form as shown in Figs. 1 and 3 while I bend it more acutely along or close to the lines 4 so that the arms 1, $1^x$ extend inward and backward as is best seen in Fig. 3. I also bend the arms at or near to the lines 5 so as to form toothed claws 6. 7, 7 are pins or nails by means of which the devices are attached to the floor. Their heads are affixed to the crown of the arched body of the device at 8 by brazing or in any other convenient way. 9, 9 are slots cut in the arms 1ˣ for the purpose of allowing the pins 7 to pass therethrough. The action of this form can now be explained.

Let us assume that we want to connect two lengths of carpet together which meet at the line 10—10, see Fig. 2. The points of the pins 7 are placed at this line and the device gently hammered or pressed down, taking care when hammering to strike on the heads of the pins. As the pins are hammered down the claws 6 come in contact with the carpets and then bite into them. As the arch is gradually flattened by this hammering the sides are moved laterally outward from one another while the free ends of the arms and the claws attached thereto are moved laterally inward. Thus, taking Fig. 3, as the arch is flattened the side 4 is pressed to the right so that the claw 5 is also moved to the right, that is inward. At the same time side 4ˣ is pressed to the left so that its claw 5ˣ is moved inward and to the left. It will therefore be seen that the claws of contiguous arms are moved toward one another and both inward, so that they pull the two pieces of carpet into which the teeth of the claws bite toward one another, and hold them firmly in position.

In practice the device may be made of any convenient length and may have any desired number of pins or nails 7 as well as any desired number of arms, claws and teeth.

The form illustrated in Figs. 5 to 7 differs only in that it has additional teeth 12. These it will be seen from Figs. 6 and 7 are not struck directly from the edge of the body-piece but are struck with short stems or spacers so as to space the downwardly projecting teeth a little away from the side 13. These teeth 12 are usually only formed on devices intended for corners of carpets as for example when pieces of carpet meet not only along the line 10—10, but along the line 11—11.

In the form illustrated in Fig. 8 there are no claws of the kind shown in the previous figures but teeth are formed on the arms themselves by the well known method of making V-shaped cuts in the sheet metal and then bending away the tongues so formed to form teeth. It will be seen that the teeth of contiguous arms point in the required opposite directions as do those in the previous forms.

Fig. 9 illustrates a form intended to cover over a hole or short rent in a floor covering. The body part is made dome-shaped. In the particular form shown there are only two arms and one pin placed between them.

This form is made of thin resilient metal so that it may be pinched from a circular to an elliptical form (when seen in plan) when being placed in position and before being pressed or hammered home. Thus, if the pinching be in the direction of the arms, that is parallel to the minor axis of the ellipse thus formed the teeth will bite into the carpet as the form resumes its circular shape which it does on release of the pinching operation and on pressing home. As an alternative to being made of thin resilient metal this dome-shaped device may be made with slits or slots, so that thicker and stronger material may be used. Such slits or slots may be made in any direction so long as they extend to the edge of the dome and allow of the necessary movement of the arms or claws. Thus in Fig. 11 of the drawings filed herewith 14 are radial slits and in Fig. 12 15 are slots arranged in the directions of chords to the periphery of the device. The use of thin metal and of slits or slots offers obvious disadvantages in the case of devices exposed to tread or foot-wear.

I have hereinbefore referred to the heads of the pins or nails as being affixed to the crown of the arched body of the device by brazing or in any other convenient way. One such convenient and obvious way is to provide the crown of the arch with holes and the pins or nails with heads, preferably of disk shape or of the form known as "half-round", and to press or drive the shanks of the said pins or nails through the said holes into the floor, the crown of the arch being depressed by the pressure of the said heads thereon. I, however, prefer to attach the pins or nails to the crown by the method first hereinbefore mentioned.

Claims:

1. A device for attaching carpets or the like to floors or to one another and for covering holes or rents comprising a plate of arched cross sectional outline, inwardly directed arms attached to opposite edges of said plate, carpet engaging claws upon said arms, said arms and claws being so arranged that when the arched plate is depressed said claws will move inward one toward the other, and pins whereby the arched plate may be secured to the floor.

2. A device for attaching carpets or the like to floors or to one another and for covering holes or rents comprising a plate of arched cross sectional outline, inwardly directed arms attached to opposite edges of said plate, inwardly directed carpet engaging claws formed upon the ends of said arms, pins for attaching said plate to the floor attached to said arched plate said arms and plate being so arranged that when the pins are driven into the floor the plate will be depressed and said claws will move inward one toward another.

3. A device for securing carpets or other fabrics in place, comprising a resilient metallic outer-plate of arched form in cross-section, having formed integral therewith a plurality of alternately arranged securing-members bent backward under the outer-plate and having the ends pointed and reversely bent toward the center of the outer-plate; and means for securing the device to the carpet or fabric and its support.

4. A device for securing carpets or other fabrics in place, comprising a resilient metallic outer-plate of arched form in cross-section; having formed integral therewith a plurality of alternately arranged securing members bent backward under the outer-plate and having the ends pointed and reversely bent toward the center of the outer-plate; and a pointed securing nail-like member secured at the base-portion to the arched outer-plate within the same and having its point extending therefrom down beyond the plane of the pointed securing-members.

5. A device for securing carpets or other fabrics in place, comprising a resilient metallic outer-plate of arched form in cross-section provided with resiliently increasing slits extending from the edge of said outer-plate inward; and sharp pointed alternately arranged carpet or fabric securing-members extending under the top plate and substantially across the same adapted to secure the carpet or fabric; and means for securing the device in position upon the carpet and carpet-support.

6. A device for securing carpets or other fabrics in place, comprising a resilient metallic outer-plate of arched form in cross-section provided with resiliently increasing slits extending from the edge of said outer-plate inward; and sharp pointed alternately arranged carpet or fabric securing-members extending under the top-plate and formed integral therewith, which are of such length as to practically traverse the top-plate; and a pointed pin member secured to the top-plate for securing the device in position upon the carpet and carpet-support.

In testimony whereof I affix my signature in the presence of two witnesses.

C. T. COLBERY.

Witnesses:
  E. R. A. BROOM,
  C. A. TAYLOR.

Copies of this patent may be obtained for five cents each, by addressing the "Commissioner of Patents, Washington, D. C."